United States Patent [19]

Herndon et al.

[11] Patent Number: 4,909,376
[45] Date of Patent: Mar. 20, 1990

[54] ROBOTICALLY CONTROLLED COMPONENT FEED MECHANISM VISUALLY MONITORING PART ORIENTATION

[75] Inventors: Donnie Herndon, Palm Bay; R. C. MacKenzie, Melbourne; R. Scott Newmann, Indialantic; Eugene Trager, Melbourne, all of Fla.

[73] Assignee: Western Technologies Automation, Inc., Palm Bay, Fla.

[21] Appl. No.: 105,015

[22] Filed: Oct. 6, 1987

[51] Int. Cl.⁴ .............................................. B65G 43/08
[52] U.S. Cl. ....................................... 198/395; 901/40; 901/47; 414/225; 414/736; 414/737
[58] Field of Search ............... 414/783, 763, 774, 759, 414/225, 222, 744 B, 736, 737, 226; 901/40, 46, 47, 15; 198/455, 395, 407, 409

[56] References Cited

U.S. PATENT DOCUMENTS

| | | | |
|---|---|---|---|
| 3,298,564 | 1/1967 | Wheatley et al. | 198/455 X |
| 3,712,481 | 1/1973 | Harwood | 414/736 |
| 4,435,837 | 3/1984 | Abernathy | 198/395 X |
| 4,678,073 | 7/1987 | Anderson et al. | 198/394 X |

Primary Examiner—Robert J. Spar
Assistant Examiner—Donald W. Underwood
Attorney, Agent, or Firm—Antonelli, Terry & Wands

[57] ABSTRACT

A feed apparatus employs a vision controlled robotic manipulator in which components are dispersed into a single layer with a random orientation. The dispersing mechanism comprises a vibratory feed plate having an input hopper which receives components to be dispersed. The feed plate is controllably vibrated such that components are urged along its top surface. Located in the travel path of the components above the feed plate is a rotating cylindrical brush, which sweeps components as they are being vibrated by the feed plate and causes a single layer of components to emerge from beneath the brush and pass to a viewing/pick-up zone. This zone is backlighted, so that the components may be observed by a camera mounted directly above the backlighted layer. The camera image is analyzed by a video data processor to determine the location and orientation of a component. This information is applied to a manipulator control program for driving a robotic manipulator to pick-up a component for transport to a workpiece. The end effector of the robotic manipulator comprises a vacuum tip mounted to an end of the arm of the manipulator which is pivotable about an axis from a vertical position whereat a component may be seized to a horizontal position. At the horizontal position a set of gripping fingers is provided for seizing a component that has been captured and pivoted thereto by the vacuum tip and which is displaced in the vertical direction to cause the component to be released by the vacuum tip.

6 Claims, 2 Drawing Sheets

ROBOTICALLY CONTROLLED COMPONENT FEED MECHANISM VISUALLY MONITORING PART ORIENTATION

FIELD OF THE INVENTION

The present invention relates in general to sorting and placement apparatus and is particularly directed to a robotic system for seizing a component and accurately delivering the seized component to a registration location regardless of the shape, size and orientation of the component.

BACKGROUND OF THE INVENTION

Systems for assembly/manufacture of multicomponent devices (e.g. printed circuit boards) employ feed and placement mechanisms through which components to be assembled on a given workpiece are delivered to prescribed registration locations so that they may be readily seized and conveyed by a transport device to an assembly position on the workpiece. Because of the almost infinite variety of shapes and sizes in which components are manufactured, feed and placement mechanisms are normally custom designed or employ a limited number of unique orientation/guide elements dedicated to components of specified physical parameters. As a consequence, the manufacture/assembly of a multicomponent device requires the availability of substantial inventory of different feed mechanisms (adding to equipment overhead cost) and/or demands incremental assembly processing (which inherently suffers from substantial down time during substitution of the orientation/guide elements).

Such conventional orientation/feed mechanisms make up what is commonly known as a vibratory "feed bowl" technology, in which a three dimensional pile of components is subjected to a vibrational separation process. As the components are mechanically moved by a vibratory surface, traps in their motion paths remove those of selected size, shape or orientation for subsequent reentry into the sorting process. Those components which pass through the system are delivered (usually be means of a queue) to an output registration point. Such feed bowl mechanisms, in addition to being dedicated to use with only a particular class of components, have limited application in electronic component assembly systems where leads, which are typically randomly bent, may become enmeshed with one another and are a source of frequent jamming of the sorter.

SUMMARY OF THE INVENTION

In accordance with the present invention, the shortcomings of conventional feed and sorting mechanisms described above are obviated by a new and improved apparatus through which a batch of components or parts of a given size and shape is dispersed into a single layer with the components having a random orientation in that layer. For this purpose the apparatus comprises a vibratory feed plate a first portion of which is arranged to receive a batch of components to be dispersed and conveyed. The feed plate is controllably vibrated such that components within the batch are urged along the top surface of the feed plate. Located in the travel path of the components above the feed plate is a rotating cylindrical brush, which sweeps or deflects components of the batch as they are being vibrated by the feed plate and causes a single layer of components to emerge from beneath the brush and pass to a second portion of the feed plate. The second portion of the feed plate is illuminated (preferably backlighted through a diffuser window), so that the shapes and orientations of the components may be observed by a camera mounted directly above the backlighted layer. Data output from the camera is analyzed by a video data processor to determine the location (coordinates within the plane of the second portion of the feed plate upon which the components are dispersed) of a component, a template of the size and shape of which is contained within the processor's data base. This coordinate information is applied to a manipulator control program for driving a robotic manipulator to the location of the component of interest, so that the robotic manipulator may seize the component and transport the component to a preselected delivery location (e.g. mounting location on a workpiece).

Since a robotic manipulator is used, not only for pick and place assembly, but as part of the conveying process, the need for a queue or guide to an intermediate delivery point is obviated. In addition, because of the flexibility of the component imaging subsystem (silhouette viewing camera and associated image signal processor), the system is not limited to use with only a particular type or class of components, but has broad application to a variety of component shapes and sizes. Moreover, due to the fact that components are dispersed into a single layer (using a vibratory feed mechanism and rotational cylindrical brush), and once in a single layer posture, are conveyed using an effectively universal gripping and transport mechanism (programmable robotic manipulator), the possibility of jamming as a consequence of the orientation of terminal leads of electronic components is avoided.

Pursuant to a further aspect of the invention, the end effector of the robotic manipulator contains a dual action seize and grip mechanism for facilitating firm seizure of a component that is effectively lying on its side within the single layer and thereby not readily positioned for transport and placement by the robotic manipulator to a mounting location on a workpiece. In particular, the seize and grip mechanism comprises a 'soft' seize vacuum tip which is controllably pivotable from a vertical position, at which the vacuum tip may engage and vacuum-seize a component that is not correctly oriented (namely, lying on its side) within the single layer, to a horizontal position located adjacent to a pair of vertically extending gripping fingers which are controllably brought toward one another so as to effect a frictional, pressure engagement with opposite sides of a component that has been seized by the adjacent vacuum tip. From this gripping engagement position the gripping fingers are displaced downwardly away from the vacuum tip, causing the firmly grasped component to slide off the 'soft' hold of the vacuum tip. Witi the component now firmly grasped by the fingers of the gripping mechanism the robotic manipulator may controllably transport and place the component to a mounting location on the workpiece.

DETAILED DESCRIPTION

Figure 1:
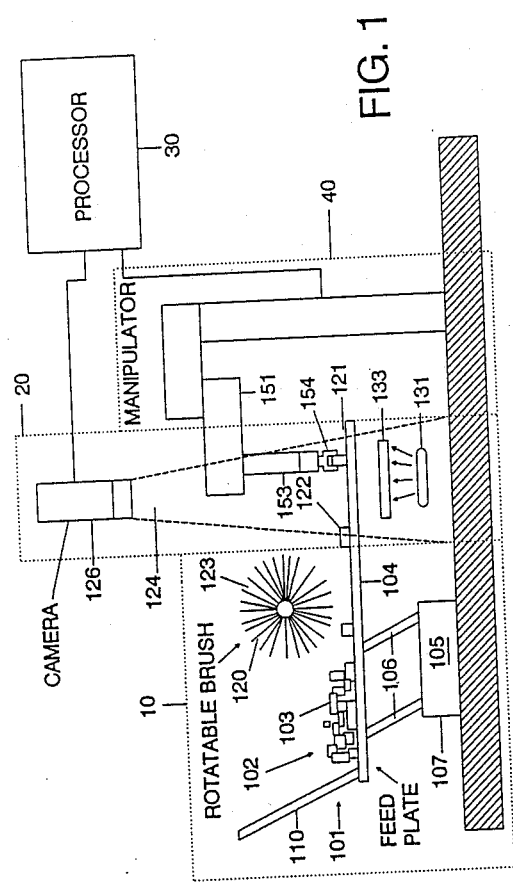
FIG. 1 is a diagrammatic side view of the component feed apparatus according to the present invention.

Referring now to FIG. 1 of the drawings a diagrammatic side view of the component feed apparatus according to the present invention is shown as comprising an integrated arrangement of a component dispersing unit 10, a component imaging unit 20, a signal processing unit 30 and a robotic manipulator 40. As diagrammatically illustrated in FIG. 1, component dispersing unit 10 is comprised of a vibratory feed plate mechanism 101 having an input or feed zone 102 into which a batch or pile of components (e.g. electronic circuit parts) 103 is supplied. Vibratory feed plate mechanism 101 is preferably comprised of a substantially flat (steel) plate 104 mounted on a vibratory support unit 105, shown diagrammatically as including oscillating leg members 106, the movement of which is controlled by means of a drive unit 107 therebeneath. Vibratory support unit 105 is preferably a commercially available unit of the type manufactured by Performance Feeders Inc. of Clearwater, Fla.

Figure 2:
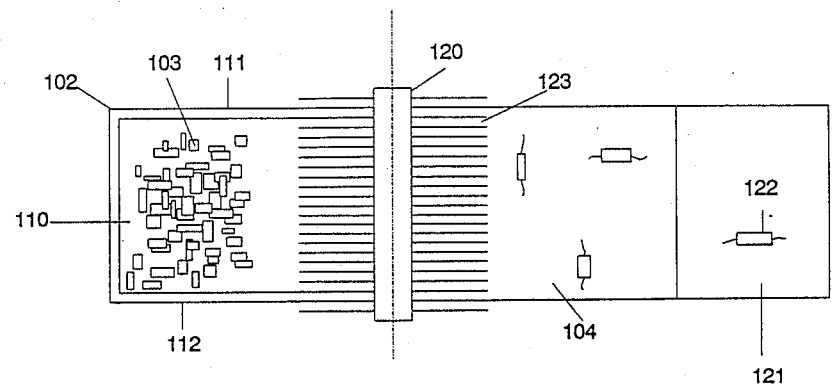
FIG. 2 is a top view of the vibratory feed plate employed in the component feed apparatus of FIG. 1.

As shown in FIG. 1 the input zone 102 of vibratory feed plate mechanism 101 is bounded by an inclined plate 110 which, together with a pair of sidewalls 111 and 112, shown in FIG. 2, forms a component receiving bin at one end of plate 104. When introduced into the feed zone 102 of the vibratory feed plate mechanism 101, the components of a batch tend to be urged to the right as viewed in FIG. 1, owing to the inclination of plate 110.

Situated slightly above the top surface 115 of plate 104 and disposed adjacent to feed zone 102 is a rotational cylindrical brush 120 which rotates about an axis 120A, clockwise as viewed in FIG. 1. The bristles 123 of brush 102 are preferably longer than the maximum dimension of a component 103 to be dispersed, and the rotational axis 120A of brush 120 is adjustable so as to provide a clearance of approximately one and one-half times the maximum dimension of a component 103 above surface 115 of plate 104. Through the combined action of the vibratory feed plate 104 and the rotation of brush 120, components that have been introduced into the feed zone 102 of the feed plate mechanism 101 become dispersed into a single layer 122 as they emerge from beneath the rotating brush 120 onto a 'viewing' zone 121 of plate 104. In effect, the counter rotating action of the brush 120 against the normal flow of the components as they are urged from the feed zone 102 along the surface of the feed plate 104 tends to sweep components at the top of the batch back into the feed zone 102 and permits components at the bottom of the batch to pass beneath the brush 120 and be dispersed into a single layer 122 in the area of viewing zone 121 of plate 104.

That portion of plate 104 which comprises the viewing zone 121 is made of translucent material (e.g. a sheet of clouded plastic or glass) which is intercepted by the field of view 124 of a camera 126 located above plate 104, as shown. Viewing zone 121 is preferably backlighted by means of a light source 131 and an associated diffuser plate 133 disposed directly beneath plate 104. As a consequence, the dispersed single layer of components 122 is viewed by camera 126 as a dispersed array of opaque (polygonal) shapes or silhouettes of the components. The output data from camera 126 representative of these dispersed shapes is coupled to signal processing unit 30 wherein a component identification and location algorithm (to be described below) is executed for enabling an associated robotic manipulator 40 to seize and transport a respective component of the dispersed single layer 122.

For this purpose camera 126, signal processing unit 30 and robotic manipulator unit 40 are preferably contained within an integrated, processor-controlled, vision-to-robot component manipulator system, such as an AdeptVision System manufactured by Adept Technology Inc. of Sunnyvale, Calif. As will be described below in conjunction with the description of the operation of the invention, such a vision-to-robot system contains a data base of a variety of component shapes and sizes with which a component of interest of the dispersed layer 122 is compared for determining its type, size and orientation, so that the robotic manipulator may be controllably positioned above that component for seizure and transport to a workpiece. As an understanding of the present invention does not require a detailed description of the components and operation of such a vision-to-robot system, they will not be described here. Instead, in the description to follow the vision-to-robot system will be described in terms of the manner in which such a system interfaces with the component dispersing unit 10 and the manner in which the end effector of the axial arm of the robotic manipulator is configured to enable the end effector to seize and transport components that have been dispersed into a single layer within viewing zone 121.

Within a vision-to-robot system of the type referenced above, the robotic manipulator 40 typically comprises a dual radial arm unit 151 and axial cylindrical arm 153 extending therefrom for conducting segmented linear movement over a three line pick and place path. The lowermost end of axial cylindrical arm 153 has an end effector 154 which is provided with a component seize and grip mechanism through which an individual component, whose location and orientation have been determined by processor 30, is firmly grasped for transport to a workpiece, not shown.

Figure 3:
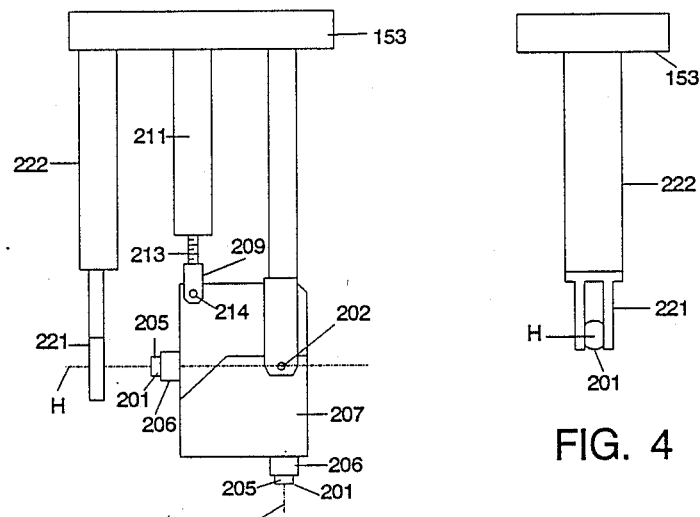
FIGS. 3 and 4 are respective diagrammatic side and end views of the configuration of the end effector of the robotic manipulator of the apparatus shown in FIG. 1.
Figure 4:
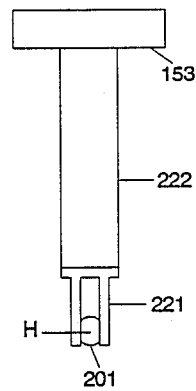

More particularly, end effector 154 contains a dual action seize and grip mechanism, shown in detail in FIGS. 3 and 4, for facilitating firm seizure of a component within dispersed layer 122, regardless of its orientation within viewing zone 121 of plate 104, for transport and placement by the robotic manipulator to a mounting location on a workpiece. Pursuant to the invention, the seize and grip mechanism comprises a 'soft' seize vacuum tip for controllably temporarily capturing the component and rotating the captured component into a position whereat the component may be firmly grasped by a pair of gripping fingers of the end effector. Once the component has been firmly grasped by the gripping fingers the soft seize vacuum tip is released and pivoted away.

Referring to FIGS. 3 and 4, end effector 154 is shown as containing a vacuum tip 201 rotatable about a pivot axis 202 between a vertical position, coincident with a vertical axis V, which is normal to the top surface of feed plate 104 and a horizontal position lying along a horizontal axis H parallel to plate 104. Vacuum tip 201 contains a controllable vacuum suction mechanism fitted with a pliable suction cup 205 and associated suction hose fittings 206 supported between a pair of rotatable pivot plates 207. Rotatable pivot plates 207 are mounted to a translation bracket 209 which, in turn, is coupled to a threaded translation drive shaft 213 of linear translation drive unit 211 extending from the lower end of axial arm unit 153. Translation bracket 209 is pivotably coupled to rotatable plates 207 by way of a bearing 214, so that rotation of drive shaft 213 by drive unit 211 vertically displaces bracket 209 and thereby causes plates 207 and consequently vacuum tip 201 to be rotated about pivot axis 202.

If a component is not correctly oriented (e.g. is lying on its side) within the dispersed layer 122, it is seized by vacuum tip 201, as the end effector is lowered along vertical axis V and a vacuum controllably applied to suction cup 205 causes the vacuum tip to effect a 'soft' capture of the component. Drive unit 211 then translates bracket 209 away from the surface of plate 104, so that plates 207 and consequently vacuum tip 201 are rotated about pivot axis 202 to a horizontal position lying along horizontal axis H. This horizontal position is located adjacent to pair of vertically extending gripping fingers 221 of a conventional end effector gripping mechanism 222, through which gripping fingers 221 are controllably brought toward one another, so as to effect a frictional, pressure engagement with opposite sides of a component that has been seized by the vacuum tip 201. From this gripping engagement position the gripping fingers are displaced downwardly away from the vacuum tip, causing the firmly grasped component to slide off the 'soft' hold of the suction cup 205. With the component now firmly grasped by the fingers 221 of the gripping mechanism, and vacuum tip 201 being positioned in its horizontal position, it can be seen that the lowermost point of the end effector is the pair of gripping fingers 221 which presently hold the component to be delivered to the workpiece. As a result, during transport from the present component pick-up location to a delivery location on a workpiece, vacuum tip 201 is effectively out of the way of the transport and placement action carried out by the gripping fingers 221.

OPERATION

As pointed out previously, the vision-to-robot system, which corresponds to the camera 126, signal processor 30 and programmable robotic manipulator 40 of the system shown in FIG. 1, effects the capture, transport and placement of components that have been dispersed within viewing zone 121 of the feed plate 104. The operational sequence in accordance with which signal processor 30 responds to the image data from camera 126 and controls programmable manipulator 40 is embodied in control algorithms contained within the software package supplied by the vision-to-robot manufacturer (here, for example, Adept Technology Inc., identified above). This vendor-supplied or canned software will not be described in detail here, since an understanding of the same is unnecessary for an appreciation of the present invention. Instead, the sequence of events through which the various components of the system shown in the system in FIG. 1 are controlled to effect the dispersing, capture and transport of components will be described. (A source code listing of the control software is set forth below in Appendix A.)

CALIBRATION PROCEDURE

In preparation for pick-and-place capture of components within the single layer 121 (by robotic manipulator 40) that have been dispersed by means of the vibratory feed plate mechanism 101, it is necessary initially to calibrate the system so as to resolve the coordinate reference frame of the imaging camera 126 to that of robotic manipulator 40. The software contained within the signal processor 30 as supplied by the robot-to-vision system manufacturer employs a dummy target which is placed on the viewing zone 121. The robotic manipulator 40 is controlled so as to make several passes after each of which an image of the viewing zone is taken by camera 126. Software within the signal processor 30 determines the direction in which the target component appears to move in the image and, by knowing the direction in which the robotic manipulator was moved, it computes the fixed relationship between camera 126 and robot arm 153.

After this initial coarse calibration sequence, the relationship between the camera and the robot arm is fine tuned. In this circumstance, a specially shaped component, which is circularly symmetric, such as a washer, is placed in the viewing zone 121 by an operator. A predefined name of this part or target is assigned to the part before training it to the system. At system initialization, a 'grip transformation' code for that part is loaded into signal processor 30 by the operator and combined with the data that has been generated by the previously executed calibration routine in the form of a compound transformation. This combined data is then used as the working calibration data for resolving the vision coordinates (as viewed by camera 126) to the robot coordinates.

Once the vision-to-robot system has been calibrated, off-line training of the system for each different type of physical part to be processed is required. This training procedure is used to generate and store a description of a new physical component shape in a manner which will allow the system to recognize and process that shape, given only the name of the part as an input.

For this purpose, the signal processor 30 contains a pair of data files to process the component. The first data file is a description of the outline or silhouette of the component which allows matching of a silhouette image to its theoretical outline. The second data file is a spatial transformation which is applied to the coordinates returned by the vision system for component location, resulting in a set of coordinates to be used by the robotic manipulator 40 to actually seize the component. This spatial transformation is termed a 'grip transformation' and allows the system to seize a component at a specific location on that component other than its center of gravity, and at a specific rotational orientation that is required to handle the component correctly.

This 'silhouette' training procedure is a canned program supplied by the vision-to-robot system manufacture (again the above-referenced Adept Technology Inc.) and operates as follows. The system operator is required to prepare several typical samples of a component to be trained and to assign a name to each new component shape. That name of the new component shape becomes part of the data file under which information generated will be stored. The system operator then places a sample component within the viewing zone 121 of the feed plate 104 and enables the system for operation. The camera/vision system examines the component and displays a proposed silhouette on a TV monitor observed by the system operator. The operator then edits the edges and corners of the displayed silhouette in accordance with the software procedure supplied by the manufacturer. Several samples of the component are placed in the viewing zone and "shown" to the system. Through this editing process a statistical description of the component is generated and stored within a system. This procedure generates a first data file required by the system for 'recognition' of the component. Next, one of the sample components is placed in the viewing zone 121 of camera 126 and the signal processor 30 operates the robotic manipulator 40 to drive the pick-up arm 153 to a position for sizing the component, based upon raw location data determined by the camera 126. This raw location data corresponds to the center of gravity of the silhouette of the component as backlighted through the viewing zone 121, and at a rotational orientation which is based upon a random orientation of the initial sample shown during a previous set-up step.

The system operator next controls the manipulator 40 to drive the arm 153 to a position and orientation such that the end defector is correctly located for seizing the component. The difference between the original 'default' pick-up orientation and this 'taught' pick-up orientation is determined by signal processor 30 and employed as data for the 'grip transformation' procedure.

Signal processor 30 stores the two data files using the component name assigned by the operator. These pair of data files can be loaded and used to process the same part shape in the future simply by specifying the part name at that time.

As pointed out previously, in order to provide effective universal capability, the combination of the vibratory feed plate mechanism 101 and the vision-to-robot system of the present invention is designed to handle a variety of differently shaped and sized components. To accommodate different sizes and shapes at the input feed portion of the system, rotational brush 120 is adjustable vertically relative to the surface 115 of plate 104. Preferably, the clearance between the bottom of the rotating brush 120 and the surface 115 of the vibratory feed plate 104 is adjusted nominally to one and one/half times the thickness of the component as it lays flat on the surface of the plate in a preferred natural orientation. This setting of the brush optimizes the mechanical configuration of the feeder for the processing of a specific type of component.

In order to verify that a specific component shape to be processed is recognizable by the vision-to-robot system based upon previously prepared data files for the part having that name, an initialization run procedure is conducted. In this operation, the operator may supply the name of the part as an input to the signal processor 30. The system then requests that a first component be placed beneath the camera 126 and remaining components be loaded into the input zone 102 of the vibratory feed plate mechanism 101. Camera 126 takes a picture of this first component and attempts to recognize the component using the previously stored data files describing that component shape. If the component is not recognized, the system informs the operator so that the processing may be avoided. In this circumstance, further training or a repeat procedure described above may be necessary. If the component is recognized, that initial picture taken by the camera is used on entry to the main control program employed by signal processor 30.

Assuming that the system has been calibrated and components of interest identified to the system in accordance with the procedures described above, it is also necessary to control the operation of the vibratory feed plate mechanism 101 for sequentially advancing the parts into the single layer 122 to be seized and transported by the robotic manipulator 40. It is also necessary to terminate the operation of this mechanism when the parts have reached the viewing/pick-up zone and determine when the supply of parts has been exhausted.

While this operation may be conducted manually, it is preferably carried out through a feed plate mechanism control algorithm embodied in the software within the signal processor 30. Each of rotational brush 120 and drive unit 105 for the vibratory feed plate 101 are controlled through a set of relays (not shown) by processor 30. Initially, the control sequence for these components causes the vibratory feed plate mechanism 101 to be enabled, thereby advancing the components from the feed zone 102 toward brush 120 and the viewing zone 121. At the same time, brush 120 begins rotating (in a clockwise direction as viewed in FIG. 1). The counter rotation of brush 120 serves to inhibit all but the bottom layer of the components from advancing beneath the brush and emerging therefrom within the viewing zone 121. Components lying on the top of the pile or batch are brushed back, keeping them in the input zone while allowing the bottom layer of the components to emerge into the viewing zone.

With parts being dispersed into the viewing zone 121, camera 126 takes a picture of the single layer of components that emerge beneath the brush 120. If a 'blob' (fuzzy picture) is seen by the camera, and if it is large enough to represent one of the components being processed, then the control algorithm disables the relays which operate the brush 120 and drive unit 105 and waits for vibrations to subside. Next, the camera takes a picture to be used for locating a component in the viewing zone, the picture being processed in the manner described above to locate the position of the component relative to the robot arm and the orientation of the pat on the viewing zone 121. Signal processor 30 also contains a soft timer which is used to disable the operation of drive unit 105 and rotation of brush 120 if a prescribed period of time has elapsed without any potential component having being seen by the camera 126. If this time out period does not expire, camera 126 is enabled to take another picture and locate additional components.

Assuming that a component has been recognized within the viewing zone 121, the control algorithm within processor 30 drives the robotic manipulator 40 to the pick-up point where the part is located using the 'grip transformation' data from the data file for that part name with the calibration data for the vision-to-robot system, as described above.

If no part is recognized within the viewing zone 121, it is assumed that the vibratory feed plate and brush need to be enabled to advance parts and disperse parts from the input zone 102 into the viewing zone 121. Assuming that there are parts to be dispersed, this operation is conducted and the camera is enabled as described above, to take a picture of the viewing zone. If a part which has been detected in the viewing zone is not acquired, the above described procedure is repeated so that the manipulator 40 will direct the end effector to seize the part in the manner described above with reference to FIGS. 3 and 4.

Of course, it is possible that a part may not be recognized and not be picked up by the robotic manipulator for some reason. In this case, the continued vibration of the vibratory feed plate will cause the part to fall off the end of the table for manual disposition by the operator. In this case, the operator simply returns the component to the feed zone 102.

From the foregoing description, it can be seen that the shortcomings of conventional feed and sorting mechanisms (e.g. custom designed transports and feed bowl mechanisms) are obviated by a new and improved apparatus through which a batch of components or parts of a given size and shape may be dispersed into a single layer with the components having a random orientation in that layer. Once dispersed into the single layer, the shapes and orientations of the components are observed by a camera mounted directly above the backlighted layer. Data output from the camera is analyzed by a video data processor to determine the location of a component. This coordinate information is applied to a manipulator control program for driving a robotic manipulator to the location of the component of interest, so that the robotic manipulator may seize the component and transport the component to a preselected delivery location (e.g. mounting location on a workpiece). Since a robotic manipulator is used, not only for pick-and-place assembly, but as part of the conveying process, the need for a queue or guide to an intermediate delivery point is obviated. In addition, because of the flexibility of the component imaging subsystem (silhouette viewing camera and associated image signal processor), the system is not limited to use with only a particular type or class of components, but has broad application to a variety of component shapes and sizes. Moreover, due to the fact that components are dispersed into a single layer (using a vibratory feed mechanism and rotational cylindrical brush), and once in a single layer posture, are conveyed using an effectively universal gripping and transport mechanism (programmable robotic manipulator), the possibility of jamming as a consequence of the orientation of terminal leads of electronic components is avoided.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. An end effector for an arm of a robotic manipulator comprising:
    a first component seizure device mounted to an end of said arm and controllably pivotable about an axis from a first position whereat a component may be seized thereby to a second position; and
    a second component seizure device mounted to said end of said arm adjacent to said second position and including means for seizing a component delivered thereto by said first component seizing device and causing said delivered component to be released by said first component seizure device; and wherein
    said first component seizure device comprises a vacuum element engageable with a component to be captured thereby by means of suction between said vacuum element and said component, said vacuum element being pivotable about said axis between said first position and said second position, and wherein said second component seizure device comprises a mechanical gripping device for mechanically gripping said component that has been captured by said vacuum element and causing said component to be released therefrom.

2. An end effector according to claim 1, wherein the position at which said mechanical gripping device causes said component to be released from said vacuum element is separated from the end of said arm by a distance greater than the second position to which said vacuum element has been pivoted.

3. An apparatus for receiving a batch of components and conveying an individual one of the components of said batch to a prescribed location of a workpiece comprising:
    a first surface;
    first means for receiving a batch of components and dispersing components therein onto said surface as a single layer of components;
    second means, optically coupled to said first surface, for generating output signals representative of an image of a component on said surface;
    a robotic manipulator, having an end effector, for controllably seizing a component from said surface and placing said component on said workpiece; and
    third means, responsive to output signals generated by said second means, for causing said robotic manipulator to seize a component on said surface and to deliver said seized component in a prescribed orientation for placement on said workpiece, and wherein said end effector is coupled to the end of an arm of said robotic manipulator and comprises:
        a first component seizure device mounted to an end of said arm and controllably pivotable about an axis from a first position whereat a component may be seized thereby to a second position; and
        a second component seizure device mounted to said end of said arm adjacent to said second position and including means for seizing a component delivered thereto by said first component seizing device and causing said delivered component to be released by said first component seizure device, and wherein
        said first component seizure device comprises a vacuum element engageable with a component to be captured thereby by means of suction between said vacuum element and said component, said vacuum element being pivotable about said axis between said first position and said second position, and wherein said second component seizure device comprises a mechanical gripping device for mechanically gripping said component that has been captured by said vacuum element and causing said component to be released therefrom.

4. An apparatus according to claim 3, wherein the position at which said mechanical gripping device causes said component to be released from said vacuum element is separated from the end of said arm by a distance greater than the second position to which said vacuum element has been pivoted.

5. An apparatus for receiving a batch of components and conveying an individual one of the components of said batch to a prescribed location of a workpiece comprising:
    a vibratory feed plate a first portion of which is arranged to receive a batch of components;
    first means for vibrating said feed plate such that components of a batch received thereby are urged along the top surface of said vibratory feed plate;

rotational brush means, located in the travel path of components urged along the top surface of said vibratory feed plate, for deflecting components of said batch and causing a single layer of components to pass thereby onto a second portion of said vibratory feed plate;

second means, optically coupled to said second portion of said vibratory feed plate, for generating output signals representative of an image of a component on said second portion of said feed plate;

a robotic manipulator, having an end effector, for controllably seizing a component from said second portion of said feed plate and placing said component on said workpiece; and third means, responsive to output signals generated by said second means, for causing said robotic manipulator to seize a component on said second portion of said feed plate and to deliver said seized component in a prescribed orientation for placement on said workpiece, wherein said end effector is coupled to the end of an arm of said robotic manipulator and comprises:

a first component seizure device mounted to an end of said arm and controllably pivotable about an axis from a first position whereat a component may be seized thereby to a second position; and a second component seizure device mounted to said end of said arm adjacent to said second position and including means for seizing a component delivered thereto by said first component seizing device and causing said delivered component to be released by said first component seizure device, and wherein said first component seizure device comprises a vacuum element engageable with a component to be captured thereby by means of suction between said vacuum element and said component, said vacuum element being pivotable about said axis between said first position and said second position, and wherein said second component seizure device comprises a mechanical gripping device for mechanically gripping said component that has been captured by said vacuum element and causing said component to be released therefrom.

6. An apparatus according to claim 5, wherein the position at which said mechanical gripping device causes said component to be released from said vacuum element is separated from the end of said arm by a distance greater than the second position to which said vacuum element has been pivoted.

* * * * *